(12) United States Patent
Blöcher et al.

(10) Patent No.: US 10,833,965 B2
(45) Date of Patent: Nov. 10, 2020

(54) METHOD AND APPARATUS FOR THE REPERCUSSION-FREE CAPTURE OF DATA

(71) Applicant: Siemens Aktiengesellschaft, München (DE)

(72) Inventors: Uwe Blöcher, Puchheim (DE); Rainer Falk, Poing (DE); Martin Wimmer, Neubiberg (DE)

(73) Assignee: SIEMENS AKTIENGESELLSCHAFT (DE)

(*) Notice: Subject to any disclaimer, the term of this patent is extended or adjusted under 35 U.S.C. 154(b) by 228 days.

(21) Appl. No.: 15/535,184

(22) PCT Filed: Dec. 10, 2015

(86) PCT No.: PCT/EP2015/079245
§ 371 (c)(1),
(2) Date: Jun. 12, 2017

(87) PCT Pub. No.: WO2016/096599
PCT Pub. Date: Jun. 23, 2016

(65) Prior Publication Data
US 2017/0353368 A1    Dec. 7, 2017

(30) Foreign Application Priority Data
Dec. 10, 2015  (DE) .......................... 10 2014 226 398

(51) Int. Cl.
*H04L 12/26*    (2006.01)
*H04L 29/06*    (2006.01)

(52) U.S. Cl.
CPC .......... *H04L 43/065* (2013.01); *H04L 43/08* (2013.01); *H04L 63/0209* (2013.01); *H04L 63/0227* (2013.01); *H04L 63/1433* (2013.01)

(58) Field of Classification Search
CPC .... G06F 21/552; G06F 21/554; G06F 21/566; G06F 21/577; H04L 41/0893;
(Continued)

(56) References Cited

U.S. PATENT DOCUMENTS 4,737,957 A * 4/1988 Nohmi ................. H04L 12/437
714/4.1
8,590,005 B2    11/2013 Payne, Jr. et al.
(Continued)

FOREIGN PATENT DOCUMENTS

WO    WO 2012170485 A1    12/2012

OTHER PUBLICATIONS

R. Fielding, Hypertext Transfer Protocol (HTTP/1.1): Message Syntax and Routing; Internet Engineering Task Force (IETF); Request for Comments: 7230; Jun. 2014; http://www.rfc-editor.org/info/rfc7230.
(Continued)

*Primary Examiner* — Christopher Biagini
(74) *Attorney, Agent, or Firm* — Schmeiser, Olsen & Watts LLP

(57) ABSTRACT

A method and an apparatus for repercussion-free capture of data from at least one device is provided, which is arranged in a first network having a high security requirement, in a second network having a low security requirement, containing a requesting unit, which is arranged within the first network and is designed to request data from the at least one device in accordance with a request profile, a monitoring unit, which is arranged within the first network and is designed to monitor data that have been sent by the at least one device in response to the request and to transmit said data to an evaluation unit, an evaluation unit, which is arranged in the second network and is designed to compare
(Continued)

the monitored data with the data expected on the basis of the request profile, and an alarm unit.

15 Claims, 2 Drawing Sheets

(58) Field of Classification Search
CPC ... H04L 41/5054; H04L 43/00; H04L 43/065; H04L 43/08; H04L 43/12; H04L 47/20; H04L 49/351; H04L 63/0209; H04L 63/0227; H04L 63/10; H04L 63/105; H04L 63/1408; H04L 63/1416; H04L 63/1425; H04L 63/1433; H04L 63/306; H04W 24/08
See application file for complete search history.

(56) References Cited

U.S. PATENT DOCUMENTS

| | | | |
|---|---|---|---|
| 2002/0188696 A1* | 12/2002 | Ullmann | H04L 43/00 709/219 |
| 2003/0198188 A1* | 10/2003 | Castlebury | E21B 47/00 370/252 |
| 2005/0129033 A1 | 6/2005 | Gallatin et al. | |
| 2006/0031476 A1* | 2/2006 | Mathes | H04L 41/0886 709/224 |
| 2009/0177721 A1* | 7/2009 | Mimatsu | H04L 67/1097 |
| 2010/0162399 A1 | 6/2010 | Cama | |
| 2010/0228854 A1* | 9/2010 | Morrison | H04L 29/00 709/224 |
| 2010/0257353 A1 | 10/2010 | Cheng et al. | |
| 2012/0173931 A1* | 7/2012 | Kube | G05B 23/0256 714/37 |
| 2012/0317569 A1 | 12/2012 | Payne, Jr. et al. | |
| 2013/0173778 A1 | 7/2013 | Hsy | |
| 2013/0268994 A1 | 10/2013 | Cooper et al. | |

OTHER PUBLICATIONS

International Search Report for PCT/EP2015/079245, dated Feb. 3, 2016; 2 pgs.

* cited by examiner

METHOD AND APPARATUS FOR THE REPERCUSSION-FREE CAPTURE OF DATA

CROSS-REFERENCE TO RELATED APPLICATIONS

This application claims priority to PCT Application No. PCT/EP2015/079245, having a filing date of Dec. 10, 2015, which is based upon and claims priority to DE Application No. 10 2014 226 398.0, having a filing date of Dec. 18, 2014 the entire contents both of which are hereby incorporated by reference.

FIELD OF TECHNOLOGY

The following relates to a method and an apparatus for the repercussion-free capture of data from at least one device, which is arranged in a first network having a high security requirement, in a second network having a low security requirement.

BACKGROUND

Security solutions for transmitting data between networks having different security requirements, so-called cross-domain security solutions, have previously been used for specific areas, such as communication with authorities, in which high security requirements apply and in which there is a security classification of documents or information. A cross-domain solution is used to implement automated secure interchange of documents and messages, for example emails, between zones with different security requirements. An important component in this case is a data diode which ensures unidirectional data communication, that is to say transport of data only in one direction.

In order to couple industrial control networks, which usually have high security requirements, to an office network, a public Internet or other control networks, which usually meet only low security requirements, use has previously been made of conventional firewalls which filter the data communication according to configurable filtering rules. In this case, the data communication is allowed or blocked on the basis of the addresses of the communication partners and the communication protocol used.

WO 2012/170485 discloses a cross-domain security solution based on a virtualization solution in which a virtual machine controls the transfer of information between two information domains.

A network decoupler, also called a network tap, is furthermore known as a network component in order to be able to eavesdrop transmitted data without influencing the transmitted data. Such network decouplers are generally used for network monitoring since parameters, such as a throughput or a latency, are not influenced by measurement here.

For industrial environments, for example for a railway safety system, there is the need to capture diagnostic data in a repercussion-free manner in the security-critical network and to make said data available to a diagnostic network which is usually implemented in a network having lower security requirements. In this case, the problem arises, in particular, of a component for one-way data transmission not being able to actively control or influence the request for an item of information in the network having a high security requirement. In the example of the railway safety system mentioned, there is a dependence on the required data being communicated without assistance.

SUMMARY

An aspect relates to a method and an apparatus which ensure that all relevant data can be detected in the security-critical network and can be transmitted to the less security-critical network in order to determine reliable diagnostic information therefrom.

The method according to embodiments of the invention for the repercussion-free capture of data from at least one device, which is arranged in a first network having a high security requirement, in a second network having a low security requirement, comprises, as the first method step, requesting the data from the at least one device according to a request profile by means of a requesting unit which is arranged inside the first network. The data transmitted from the at least one device to the requesting unit in response to the request inside the first network are then eavesdropped by an eavesdropping unit and the data are transmitted to an evaluation unit into the second network. There, the eavesdropped data are compared with the data expected according to the request profile, and an alarm signal is provided if the eavesdropped data differ from the data expected according to the request profile.

In this case, repercussion-free capture of data should be understood as meaning the fact that, as a result of the transmission from the security-relevant first network to the less security-relevant second network, no data or interference whatsoever is/are introduced into the security-relevant first network.

Requesting the data according to a predefined request profile which is known both in the requesting unit and in the evaluation unit makes it possible to clearly determine whether all required data have been transmitted to the second network and a correct function can therefore be ensured. Providing an alarm signal makes it possible to determine and monitor, for example, an error rate during the request and/or the eavesdropping and/or the transmission. This is ensured by exclusively eavesdropping the data. The eavesdropping can be carried out here by a network decoupler, that is to say a network tap, for example.

In one advantageous embodiment of the method according to the invention, an alarm message is displayed in the evaluation unit and/or in a diagnostic device in a diagnostic network as a result of the alarm signal. Additionally or alternatively, an entry in a monitoring report, also referred to as a log file, is created and/or an active reaction is triggered in the eavesdropping unit or in the requesting unit.

In this case, the initiation of a restart of the eavesdropping unit, for example, can be considered to be an active reaction or an interruption in the power supply for the requesting unit may be caused, for example, with the result that the requesting unit is restarted and requests are newly generated according to the request profile. A measure for canceling interference can therefore be carried out. Furthermore, the functionality of the requesting unit and of the eavesdropping unit can be continuously monitored by means of an entry in a monitoring report or by means of an alarm message. In particular, an alarm signal can be set if a request is made impermissibly frequently, if a request is made too rarely, if required data are not requested or if impermissible data are requested.

In another advantageous embodiment, forwarding of the eavesdropped data by the evaluation unit or reading of the eavesdropped data from the evaluation unit is blocked as a result of the alarm signal.

This prevents incorrect or impermissible data being taken into account for the evaluation and diagnosis.

In one variant of the method according to the invention, the request profile has different request rules for different types of data and/or for different types of devices and/or for individual devices themselves.

This makes it possible to generate and evaluate meaningful diagnostic values on the basis of the different types of data and/or the properties of the individual devices or types of devices. Identical request rules may respectively be set, for example, for identical types of devices, for example railroad crossings, or identical request rules may be set for all train signals or traffic lights.

In another variant, the request profile has a standard request rule for different types of data and/or for different types of devices and/or for the individual devices themselves.

This makes it possible to use a requesting unit which has a simple construction and is not very complex. However, the requesting unit may also change to a mode with a standard request rule if, for example, the number of data items identified as erroneous increases, with the result that an emergency diagnostic option can be maintained.

In one variant of the method according to the invention, the eavesdropped data are buffered in the evaluation unit and are transmitted to the diagnostic device only after a successful check.

In one variant of the method according to the invention, a successful check is present when the eavesdropped data correspond to the request profile and/or when the eavesdropped data have a valid cryptographic checksum.

This has the advantage that only relevant data and/or data transmitted with unchanged contents and transmitted by a permitted, authorized device are forwarded for evaluation and are therefore taken into account.

In one variant of the method according to the invention, a substitute value or an error message is transmitted to the diagnostic device in the event of an unsuccessful check.

Despite a falsified or irrelevant data value, this allows evaluation which is as good and continuous as possible, in particular as a result of the use of a substitute value. The error rate can be easily determined, in particular, when an error is reported.

In another exemplary embodiment of the method according to the invention, an item of validity information is assigned to the eavesdropped data in the evaluation unit after a check.

This makes it possible to assess the data even if stored for a relatively long time and simplifies management of the eavesdropped data by archiving or deleting the data record after expiry of a validity period, for example.

In one variant of the method according to the invention, the eavesdropped data are transmitted to the diagnostic computer only when the eavesdropped data have been received in the evaluation unit in a predetermined interval of time after the associated request.

This reduces the number of captured data items which do not belong to a current request profile. Furthermore, data which have been introduced by an impermissible device or an attacker in the first network can therefore be at least partially recognized and not used for the evaluation.

The apparatus according to embodiments of the invention for the repercussion-free capture of data from at least one device, which is arranged in a first network having a high security requirement, in a second network having a low security requirement, contains a requesting unit which is arranged inside the first network and is designed to request data from the at least one device according to a request profile. It contains an eavesdropping unit which is arranged inside the first network and is designed to eavesdrop data which have been transmitted from the at least one device in response to the request and to transmit said data to an evaluation unit. The apparatus also comprises an evaluation unit which is arranged in the second network and is designed to compare the eavesdropped data with the data expected according to the request profile, and an alarm unit which is designed to provide an alarm signal if the eavesdropped data differ from the data expected according to the request profile.

The apparatus therefore makes it possible to deliberately stimulate data by a request in the device and to compare the data, after transmission to the second, less secure network, with the same request profile which is known in the evaluation unit and therefore to ensure that it is possible to reliably evaluate the data.

In one advantageous embodiment of the apparatus according to the invention, the eavesdropping unit and/or the requesting unit is/are designed to detect an alarm signal and to then independently restart, or the evaluation unit is designed to block forwarding or reading of the eavesdropped data after the alarm signal has been detected.

In one variant of the apparatus according to the invention, the evaluation unit is designed to store eavesdropped data, to check the data and to transmit the data to a diagnostic device only after a successful check.

In another variant of the apparatus according to the invention, the evaluation unit is designed to check whether the eavesdropped data correspond to the request profile and/or whether the eavesdropped data have a valid cryptographic checksum and to transmit only the successfully checked data to the diagnostic device or to transmit a substitute value or an error message to the diagnostic device in the event of an unsuccessful check.

A computer program product having program instructions for carrying out the above-mentioned method is also claimed.

BRIEF DESCRIPTION

Some of the embodiments will be described in detail, with reference to the following figures, wherein like designations denote like members, wherein.

Parts which correspond to one another are provided with the same reference symbols in all figures.

DETAILED DESCRIPTION

Figure 1:
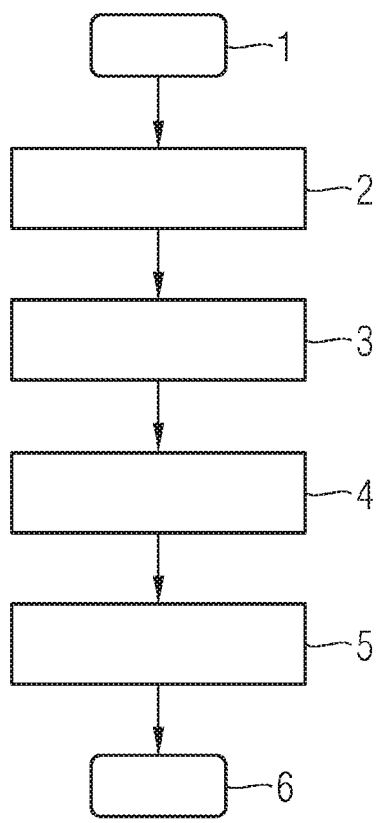
FIG. 1 shows an exemplary embodiment of the method in the form of a flowchart.

The method according to embodiments of the invention is now explained in more detail on the basis of a flowchart in FIG. 1. In the initial state 1, there is a first network having high security requirements and a second network having low security requirements. Data which are transmitted in the first network are now intended to be transmitted to the second network in a repercussion-free manner, that is to say without changing the data transmitted in the first network or without generating new data in the first network or without otherwise influencing this first network. The data are generated by at least one device in the first network and provide information relating to the operating state of the one or more units, for example. The first network also contains an eavesdropping unit which is in the form of a network decoupler or a data diode of another design, for example. The data transmitted in the first network are duplicated, for example, and the duplicate is transmitted to components into the second network, in particular to an evaluation unit.

The first network also contains a requesting unit having a request profile which contains, for example, predetermined requests and a timing scheme of when these requests are intended to be sent to the devices in the first network. The same request profile is available to an evaluation unit which is arranged in the second network. In the first method step 2, data are requested from the at least one device by the requesting unit inside the first network according to the request profile which is stored in the requesting unit. This requesting can be carried out, for example, by emitting request messages which are either directly addressed to individual devices or are received and evaluated by a plurality of devices as multicast or broadcast messages. In response to these request messages, the one or more devices transmit the requested data back to the requesting unit, for example in response messages.

The data which have been transmitted back are now eavesdropped in method step 3 by an eavesdropping unit inside the first network and are transmitted to an evaluation unit into the second network. In this case, the eavesdropping unit itself may transmit, for example, only those response messages from the devices which correspond to a response to the transmitted request messages to the second network. However, the entire data traffic which is transmitted by a device and is addressed to the requesting unit may also be eavesdropped. However, only the data traffic or the particular type of message, which is transmitted from the device to the requesting unit in a predetermined interval of time after the transmission of the request message, may also be eavesdropped or evaluated by the eavesdropping unit.

In particular, the practice of restricting the eavesdropping time to an interval of time after the emitted request message can prevent a response message which is not transmitted back in response to a current request but, in terms of format, is a message identical to a response to the request message being detected. Such response messages and the accordingly included data therefore do not falsify subsequent evaluation.

In method step 4, the eavesdropped data are then compared with the data expected according to the request profile in the evaluation unit. That is to say, the response messages are compared, for example, with the emitted request messages and a response message is accepted only if a request message can be determined for the response message.

If the eavesdropped data or response messages differ from the data or response messages expected according to the request profile, an alarm signal is provided by the evaluation unit, see method step 5. In this case, an alarm signal can be provided in the event of a single difference, that is to say if an associated request message already cannot be found for a response message, or else predetermined threshold values may also be defined with respect to a maximum number of differing data items and an alarm signal is provided only after the threshold value has been exceeded.

In response to the alarm signal, an alarm message can be displayed in the evaluation unit and/or in a diagnostic device to which the data are transmitted for further evaluation, for example. However, an entry in a monitoring report, a so-called log file, can also be created in the eavesdropping device or in the evaluation unit or else in the diagnostic device as a result of the alarm signal. It is also possible to generate an error message for operating personnel, for example in the form of a warning tone or a light signal or a display on a monitoring monitor. It is also possible to initiate an active reaction to the alarm signal. For example, the requesting unit may be restarted, for example by interrupting the power supply. This therefore allows indirect access to components in the first network. As a result, the requesting process, that is to say the emission of request messages in the requesting unit, can be newly initiated. It is also possible to forward or block eavesdropped data or to allow or prevent read access to eavesdropped data from the evaluation unit on the basis of the alarm signal.

The request profile may define different request rules for different types of observed communication. For example, if the request profile contains different request rules for different types of data and/or for different types of devices, for example for different types of units and/or for the individual devices themselves, a longer query interval may be entered in the request profile for all railroad crossings in a railway control network, for example, than for a signaling system, for example.

On the other hand, the request profile may also contain a standard request rule for different types of data, different types of devices or for the individual devices themselves. Such a simple scheme can also be supported by requesting units which are not very complex, for example.

In particular, eavesdropped data may be buffered in the eavesdropping unit or in the evaluation unit. The eavesdropped data are first of all checked before data are forwarded or read from the evaluation unit and are transmitted to the diagnostic unit. A check may be carried out, on the one hand, with respect to the request profile. However, a cryptographic checksum, which has been formed for the transmitted data or response messages by the devices themselves and has been transmitted to the requesting unit with the response message, may also be checked for its validity. For this purpose, however, the evaluation unit must contain a cryptographic key used in the device or, in the case of an asymmetric cryptographic system for example, a public key matching a private key of the device.

If such a check is not successful, a substitute value or an error message is preferably transmitted to the diagnostic unit. A check is therefore carried out in order to determine whether the buffered data have been determined in a manner corresponding to the predefined request profile. After the data have been transmitted, the method is concluded in method step 6.

The method described makes it possible to ensure a correct method of operation of the data transmission without requiring direct access to components in the first, security-relevant network. If a difference between the determined data and the predetermined request profile is determined, this is an indication of erroneous capture of diagnostic data, for example, and makes it possible, on the one hand, to identify such data as being incorrect and to take this into account in the assessment and significance of the data. Measures for eliminating such an error can also be arranged.

Figure 2:
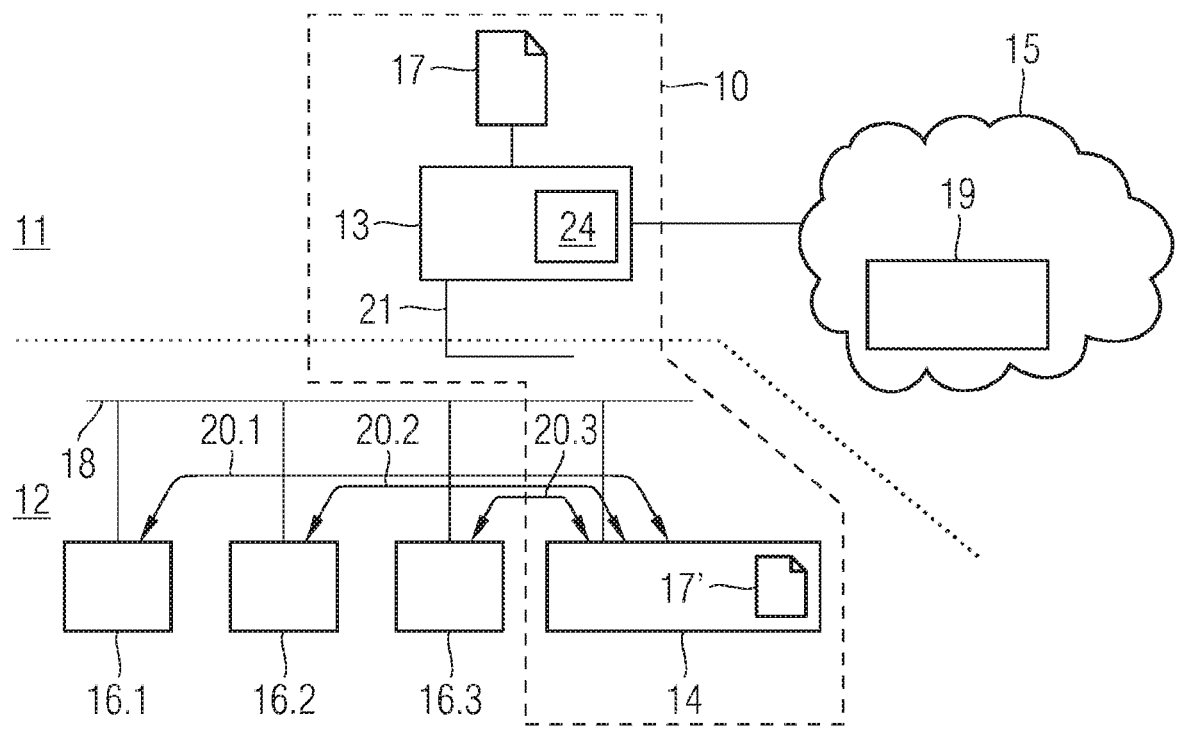
FIG. 2 shows a schematic illustration of a first exemplary embodiment of the apparatus in an exemplary automation environment.

FIG. 2 now describes a corresponding apparatus 10 for the repercussion-free capture of data by means of one-way communication using the example of an operational safety network. The operational safety network may be a railway automation network, a vehicle control network, an energy automation network, a production automation network, a process automation network or the like. The first network 12 illustrated in FIG. 2 corresponds in this case to the operational safety network which has high security requirements with regard to data transmission and access authorization.

Devices 16.1, 16.2, 16.3 in such an operational safety network may be, in particular, control computers and field devices with connected sensors or actuators. They are connected to one another via the first network 12 having high security requirements, for example via connecting lines 18 or else via wireless communication connections, for example a WLAN. The devices 16.1, 16.2, 16.3 communicate, for example, using a machine-to-machine protocol (M2M), such as an OPC-standard architecture specified by the OPC organization, called OPC UA for short, which specifies specific messages for transmitting state or alarm messages, for example, between industrial networks.

In the example illustrated, diagnostic data from the devices 16.1, 16.2, 16.3, for example, are now read in a repercussion-free manner from the first network 12 by the apparatus 10 and are transmitted to a diagnostic device 19 in a diagnostic network 15 which is arranged in a second network 11 having lower security requirements. The apparatus 10 contains a requesting unit 14, an eavesdropping unit 21, an evaluation unit 13 and an alarm unit 24.

The requesting unit 14 is arranged in the first network 12 and transmits requests to the various devices 16.1, 16.2, 16.3. The requesting unit 14 transmits these requests, for example OPC UA request messages, according to a predefined request profile 17'. The request profile 17' may have been introduced into the requesting unit 14 by a service engineer, for example, or else may have been configured in the requesting unit 14 during production or installation in the first network 12.

After such a request message has been received in the device 16.1, 16.2, 16.3, the device 16.1, 16.2, 16.3 responds with a response message, also called response. These response messages or else the information contained therein correspond(s) to the data already mentioned.

Figure 3:
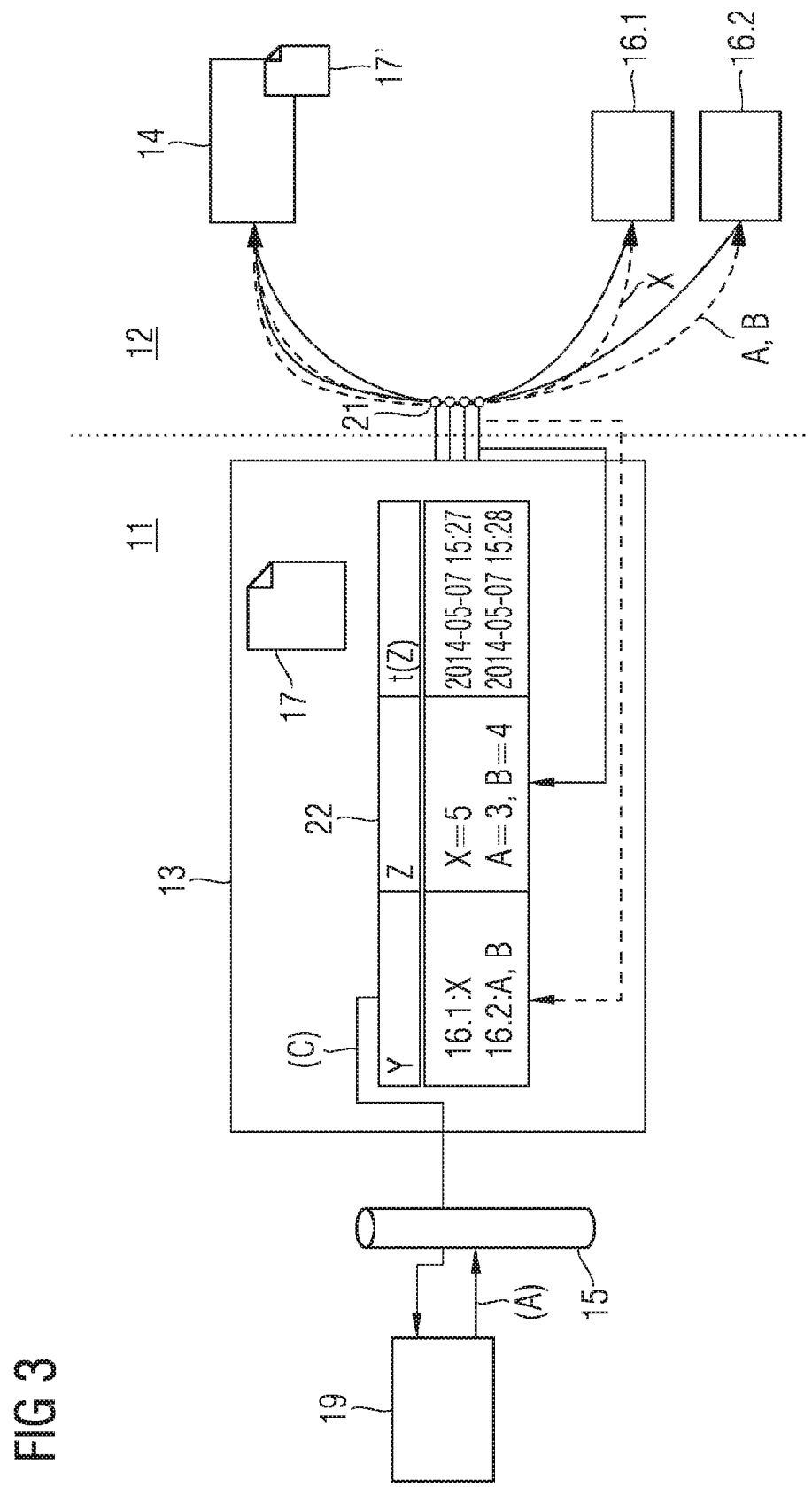
FIG. 3 shows a schematic illustration of a second exemplary embodiment of the apparatus having data buffered in an evaluation unit.

One-way communication is read by the eavesdropping unit 21 from the first network 12 by eavesdropping the data traffic on the connecting line 18, for example, and is transmitted to the evaluation unit 13. The evaluation unit 13 is preferably already arranged in the second network 11, for example an office network having lower security requirements. The boundary between the first network 12 and the second network 11 is illustrated by the dotted line in FIG. 2 and likewise in FIG. 3.

The eavesdropping unit 21 can only eavesdrop data which are transmitted in the first network 11 in order to ensure freedom from repercussions. It cannot transmit any messages whatsoever to devices 16.1, 16.2, 16.3 and also cannot transmit any messages to the requesting unit 14. It may eavesdrop, for example, the entire data traffic transmitted on the connecting line 18 or only messages of OPC UA communication which have been requested by the requesting unit 14.

The evaluation unit 13 in the second network 11 checks the eavesdropped data traffic or the messages of OPC UA communication against a request profile 17 which corresponds to the request profile 17' in the requesting unit 14. The eavesdropped data are made available to the diagnostic computer 19 depending on whether the eavesdropped OPC UA communication corresponds to this request profile. In particular, this means that only eavesdropped data which correspond to the request profile 17, 17' are forwarded. This makes it possible to prevent, in particular, impermissible or out-of-date communication being forwarded. It is also possible to achieve the situation in which data are forwarded only if an associated request message 20.1, 20.2, 20.3 has been observed.

In the exemplary embodiment illustrated here, the evaluation unit has an integrated alarm unit 24 which provides an alarm signal in the event of an unsuccessful check of the eavesdropped data. The alarm signal can be implemented in the evaluation unit 13 itself, for example as an entry in a monitoring report of the evaluation unit 13. However, the alarm signal may also initiate the generation of an error message which is sent to the diagnostic unit 19.

The diagnostic device 19 may likewise make requests of the evaluation unit 13 using an OPC UA request, for example. This is usually referred to as a message pull. The corresponding data are provided depending on whether suitable data communication which complies with the request profile 17, 17' has been observed. If the request profile 17, 17' is violated, a substitute value or an error can be reported back. The data may likewise be actively made available to the diagnostic unit 19 by the evaluation unit 13. This is also referred to as a push mode.

In order to support the pull mechanism, the evaluation unit 13 can buffer eavesdropped data from the first network 12. This is now described on the basis of an enlarged illustration of the evaluation unit 13 in FIG. 3.

Eavesdropped data, here the OPC UA communication entries for example, can be held in a local data memory 22, for example. In this case, each request message X, A, B, for example, is recorded in the column Y together with the information regarding to whom the request message was addressed. The column Z stores the response messages or data reported back to the requesting unit 14 in a response message. The column t(Z) records the receiving time of the response message. The request messages X, A, B recorded in the local data memory 22 are depicted as a request message A, B, X from the requesting unit 14 to the devices 16.1, 16.2 in the right-hand part of FIG. 3 which illustrates the first network 11. The corresponding response messages are depicted without their own reference symbol for the sake of better clarity. The response messages and/or also the request messages are tapped off, for example from connecting lines, via the eavesdropping unit 21 in the first network 12.

These actual request messages and response messages can now be compared with the request profile 17 in the evaluation unit 13 which is arranged, for example, in the second network 11. The detection time of the response message can likewise be used to determine whether the response message has been received in a predefined time window after a transmission time of the request message. If the request messages match the predetermined request profile 17, 17' and/or if the associated response messages have been received in the predefined interval of time, they are transmitted to the diagnostic device 19, for example via a diagnostic network 15. Detected data may be requested from the evaluation unit 13 by the diagnostic device 19. However, the evaluation unit 13 may also automatically transmit diagnostic data to the diagnostic device 19, for example at a predefined interval of time.

All of the described and/or depicted features can be advantageously combined with one another within the scope of the invention. The invention is not restricted to the exemplary embodiments described. In particular, the invention is not restricted to the diagnostic network used as an example, for example of a railway safety system, but rather may also be used in other industrial environments.

In this case, the requesting unit 14 may also be in the form of a unit which is physically separate from the eavesdropping unit, the evaluation unit and the alarm unit. The eavesdropping unit 21 may likewise be in the form of a physically separate unit or else may be integrated with the evaluation unit 13 and the alarm unit 24.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for the repercussion-free capture of data from at least one device, which is arranged in a first network having a high security requirement, into a second network having a low security requirement, having the method steps of:
   requesting the data from the at least one device according to a request profile by means of a requesting unit which is arranged inside the first network,
   eavesdropping the data transmitted from the at least one device to the requesting unit in response to the request inside the first network by means of an eavesdropping unit, wherein the eavesdropping unit cannot transmit any messages to the at least one device and cannot transmit any messages to the requesting unit,
   transmitting the data to the second network,
   comparing, within the second network, the eavesdropped data with the data expected according to the request profile, and
   providing an alarm signal if the eavesdropped data differ from the data expected according to the request profile, the request profile containing predetermined requests and a timing scheme of when these requests are intended to be sent to the at least one device in the first network,
   wherein during the requesting, eavesdropping, and transmitting steps, neither the eavesdropping unit nor the second network change the data transmitted in the first network, generate new data in the first network, or otherwise influence the first network.

2. The method as claimed in claim 1, an alarm message being at least one of: displayed in a diagnostic network; an entry in a monitoring report being created; an active reaction being triggered in the eavesdropping unit; and an active reaction being triggered in the requesting unit as a result of the alarm signal.

3. The method as claimed in claim 2, forwarding of the eavesdropped data or reading of the eavesdropped data being blocked as a result of the alarm signal.

4. The method as claimed in claim 2, the eavesdropped data being buffered and being transmitted to the diagnostic network only after a successful check.

5. The method as claimed in claim 4, a successful check being present when at least one of the eavesdropped data correspond to the request profile and the eavesdropped data have a valid cryptographic checksum.

6. The method as claimed in claim 4, a substitute value or an error message being transmitted in the event of an unsuccessful check.

7. The method as claimed in claim 1, the request profile having different request rules for at least one of: different types of data; different types of devices and individual devices.

8. The method as claimed in claim 1, the request profile having a standard request rule for at least one of: different types of data; different types of devices and the individual devices themselves.

9. The method as claimed in claim 1, an item of validity information being assigned to the eavesdropped data after a check.

10. The method as claimed in claim 1, the eavesdropped data being transmitted to the diagnostic network only when the eavesdropped data have been received in a predetermined interval of time after the associated request.

11. An apparatus for the repercussion-free capture of data from at least one device, which is arranged in a first network having a high security requirement, in a second network having a low security requirement, containing
    a requesting unit which is arranged inside the first network and is designed to request data from the at least one device according to a request profile,
    an eavesdropping unit which is arranged inside the first network and is designed to eavesdrop data which have been transmitted from the at least one device in response to the request, wherein the eavesdropping unit cannot transmit any messages to the at least one device and cannot transmit any messages to the requesting unit, and to transmit said data into an evaluation unit,
    an evaluation unit which is arranged in the second network and is designed to compare the eavesdropped data with the data expected according to the request profile, and
    an alarm unit which is designed to provide an alarm signal if the eavesdropped data differ from the data expected according to the request profile, the request profile containing predetermined requests and a timing scheme of when these requests are intended to be sent to the at least one device in the first network,
    wherein neither the eavesdropping unit nor the second network change the data transmitted in the first network, generate new data in the first network, or otherwise influence the first network.

12. The apparatus as claimed in claim 11, at least one of the eavesdropping unit and the requesting unit being designed to detect an alarm signal and to then independently restart, or the evaluation unit being designed to block forwarding or reading of the eavesdropped data after the alarm signal has been detected.

13. The apparatus as claimed in claim 11, the evaluation unit being designed to store eavesdropped data, to check the data and to transmit the data to a diagnostic network only after a successful check.

14. The apparatus as claimed in claim 13, the evaluation unit being designed to check whether at least one of the eavesdropped data correspond to the request profile and the eavesdropped data have a valid cryptographic checksum and to transmit only the successfully checked data to the diagnostic network or to transmit a substitute value or an error message to the diagnostic device in the event of an unsuccessful check.

15. A computer program product, comprising a computer readable hardware storage device having computer readable program code stored therein, said program code executable by a processor of a computer system to implement a method for the repercussion-free capture of data from at least one device, which is arranged in a first network having a high security requirement, into a second network having a low security requirement, the method comprising:

requesting the data from the at least one device according to a request profile by means of a requesting unit which is arranged inside the first network, eavesdropping the data transmitted from the at least one device to the requesting unit in response to the request inside the first network by means of an eavesdropping unit, wherein the eavesdropping unit cannot transmit any messages to the at least one device and cannot transmit any messages to the requesting unit, transmitting the data to the second network, comparing, within the second network, the eavesdropped data with the data expected according to the request profile, providing an alarm signal if the eavesdropped data differ from the data expected according to the request profile, the request profile containing predetermined requests and a timing scheme of when these requests are intended to be sent to the at least one device in the first network, wherein during the requesting, eavesdropping, and transmitting steps, neither the eavesdropping unit nor the second network change the data transmitted in the first network, generate new data in the first network, or otherwise influence the first network.

* * * * *